(12) United States Patent
Telefus

(10) Patent No.: US 9,711,990 B2
(45) Date of Patent: Jul. 18, 2017

(54) NO LOAD DETECTION AND SLEW RATE COMPENSATION

(71) Applicant: Flextronics AP, LLC, Broomfield, CO (US)

(72) Inventor: Mark Telefus, Orinda, CA (US)

(73) Assignee: Flextronics AP, LLC, Broomfield, CO (US)

( * ) Notice: Subject to any disclaimer, the term of this patent is extended or adjusted under 35 U.S.C. 154(b) by 83 days.

(21) Appl. No.: 13/924,388

(22) Filed: Jun. 21, 2013

(65) Prior Publication Data

US 2014/0268912 A1    Sep. 18, 2014

Related U.S. Application Data

(60) Provisional application No. 61/799,124, filed on Mar. 15, 2013.

(51) Int. Cl.
*H02M 3/335*  (2006.01)
*H02J 7/02*   (2016.01)
(Continued)

(52) U.S. Cl.
CPC .............. *H02J 7/025* (2013.01); *H02J 50/10* (2016.02); *H02J 50/12* (2016.02);
(Continued)

(58) Field of Classification Search
CPC ..... H02M 3/33507; H02M 2001/0032; H02M 2001/0035; H02M 2003/1566;
(Continued)

(56) References Cited

U.S. PATENT DOCUMENTS 4,234,920 A    11/1980    Van Ness et al.
4,273,406 A     6/1981    Okagami
(Continued)

FOREIGN PATENT DOCUMENTS

JP    4217869 A    8/1992
JP   10243640 A    9/1998
(Continued)

OTHER PUBLICATIONS

EE Times.com—"Team Claims Midrange Wireless Energy Transfer", by R. Colin Johnson, 4 pages, Nov. 6, 2007.
(Continued)

*Primary Examiner* — Harry Behm
*Assistant Examiner* — Bryan R Perez
(74) *Attorney, Agent, or Firm* — Haverstock & Owens LLP

(57) ABSTRACT

The power regulation control circuit is implemented during two modes. A first mode is a sleep mode and a second mode is a wake-up mode. During the sleep mode, the power supply detects a no-load presence and artificially increases the output voltage Vout to its maximum allowable value. In some embodiments, this is accomplished by pulling up an output of a error amplifier that feeds a PWM module. During the wake-up mode when the power supply wakes up from the sleep mode under maximum load, the output voltage Vout sinks from the artificially higher voltage, but still stays above a minimum operational voltage level. A slew rate compensation can be implemented to control a rate at which the output voltage drops when a load is applied. The artificially high output voltage during no-load condition and the slew rate compensation provide open loop voltage adjustment.

20 Claims, 5 Drawing Sheets

(51) Int. Cl.
- *H04B 5/00* (2006.01)
- *H02J 50/12* (2016.01)
- *H02J 50/10* (2016.01)
- *H03K 17/00* (2006.01)

(52) U.S. Cl.
CPC ........ *H02M 3/33507* (2013.01); *H03K 17/00* (2013.01); *H04B 5/0037* (2013.01)

(58) Field of Classification Search
CPC ............... H02M 1/32; H02M 3/33538; H02M 3/33546; H02M 3/33515; H02M 3/33576; H02M 3/33592; H02M 3/33553; H02M 3/33523
USPC .............. 363/21.12, 21.14, 44, 49; 713/320; 323/901
See application file for complete search history.

(56) References Cited

U.S. PATENT DOCUMENTS

| | | | |
|---|---|---|---|
| 4,327,298 | A | 4/1982 | Burgin |
| 4,370,703 | A | 1/1983 | Risberg |
| 4,563,731 | A | 1/1986 | Sato et al. |
| 4,607,323 | A | 8/1986 | Sokal |
| 4,611,289 | A | 9/1986 | Coppola |
| 4,642,616 | A | 2/1987 | Goodwin |
| 4,645,278 | A | 2/1987 | Yevak et al. |
| 4,658,204 | A | 4/1987 | Goodwin |
| 4,703,191 | A | 10/1987 | Ferguson |
| 4,712,160 | A | 12/1987 | Sato et al. |
| 4,742,424 | A | 5/1988 | Kautzer et al. |
| 4,788,626 | A | 11/1988 | Neidig et al. |
| 4,806,110 | A | 2/1989 | Lindeman |
| 4,837,495 | A * | 6/1989 | Zansky ........................ 323/222 |
| 4,841,220 | A | 6/1989 | Tabisz et al. |
| 4,857,822 | A | 8/1989 | Tabisz et al. |
| 4,866,367 | A | 9/1989 | Ridley et al. |
| 4,890,217 | A | 12/1989 | Conway |
| 4,893,227 | A | 1/1990 | Gallios et al. |
| 4,899,256 | A | 2/1990 | Sway |
| 4,901,069 | A | 2/1990 | Veneruso |
| 4,985,804 | A | 1/1991 | Campbell et al. |
| 5,065,302 | A | 11/1991 | Kanazawa |
| 5,090,919 | A | 2/1992 | Tsuji |
| 5,101,322 | A | 3/1992 | Ghaem et al. |
| 5,105,182 | A | 4/1992 | Shindo |
| 5,126,931 | A | 6/1992 | Jitaru |
| 5,132,890 | A | 7/1992 | Blandino |
| 5,235,491 | A | 8/1993 | Weiss |
| 5,283,792 | A | 2/1994 | Davies et al. |
| 5,325,283 | A | 6/1994 | Farrington |
| 5,365,403 | A | 11/1994 | Vinciarelli et al. |
| 5,373,432 | A | 12/1994 | Vollin |
| 5,434,768 | A | 7/1995 | Jitaru et al. |
| 5,437,040 | A | 7/1995 | Campbell et al. |
| 5,442,540 | A | 8/1995 | Hua |
| 5,673,185 | A | 9/1997 | Albach et al. |
| 5,712,772 | A | 1/1998 | Telefus et al. |
| 5,717,936 | A | 2/1998 | Uskali |
| 5,768,118 | A | 6/1998 | Faulk et al. |
| 5,786,992 | A | 7/1998 | Vinciarelli et al. |
| 5,790,395 | A | 8/1998 | Hagen |
| 5,811,895 | A | 9/1998 | Suzuki et al. |
| 5,838,171 | A | 11/1998 | Davis |
| 5,838,554 | A | 11/1998 | Lanni |
| 5,841,641 | A | 11/1998 | Faulk |
| 5,859,771 | A | 1/1999 | Kniegl |
| 5,903,452 | A * | 5/1999 | Yang ........................ 363/97 |
| 5,905,369 | A | 5/1999 | Ishii et al. |
| 5,923,543 | A | 7/1999 | Choi |
| 5,949,672 | A | 9/1999 | Bernet |
| 5,978,238 | A | 11/1999 | Liu |
| 5,982,153 | A | 11/1999 | Nagai et al. |
| 6,009,008 | A | 12/1999 | Pelly |
| 6,038,155 | A * | 3/2000 | Pelly ........................ 363/129 |
| 6,091,611 | A | 7/2000 | Lanni |
| 6,183,302 | B1 | 2/2001 | Daikuhara et al. |
| 6,191,957 | B1 | 2/2001 | Peterson |
| 6,272,015 | B1 | 8/2001 | Mangtani |
| 6,275,397 | B1 | 8/2001 | McClain |
| 6,307,761 | B1 | 10/2001 | Nakagawa |
| 6,323,627 | B1 | 11/2001 | Schmiederer et al. |
| 6,356,465 | B2 | 3/2002 | Yasumura |
| 6,366,476 | B1 | 4/2002 | Yasumura |
| 6,385,059 | B1 | 5/2002 | Telefus et al. |
| 6,385,061 | B1 | 5/2002 | Turchi |
| 6,388,897 | B1 | 5/2002 | Ying et al. |
| 6,390,854 | B2 | 5/2002 | Yamamoto et al. |
| 6,396,716 | B1 | 5/2002 | Liu et al. |
| 6,452,816 | B2 | 9/2002 | Kuranuki |
| 6,459,175 | B1 | 10/2002 | Potega |
| 6,466,460 | B1 | 10/2002 | Rein |
| 6,487,098 | B2 | 11/2002 | Malik et al. |
| 6,549,409 | B1 | 4/2003 | Saxelby et al. |
| 6,578,253 | B1 | 6/2003 | Herbert |
| 6,721,192 | B1 | 4/2004 | Yang et al. |
| 6,775,162 | B2 | 8/2004 | Mihai et al. |
| 6,894,461 | B1 | 5/2005 | Hack et al. |
| 6,919,715 | B2 | 7/2005 | Muratov et al. |
| 6,989,997 | B2 | 1/2006 | Xu |
| 6,990,000 | B1 | 1/2006 | Rodriguez et al. |
| 7,035,126 | B1 | 4/2006 | Lanni |
| 7,038,406 | B2 | 5/2006 | Wilson |
| 7,102,251 | B2 | 9/2006 | West |
| 7,139,180 | B1 | 11/2006 | Herbert |
| 7,202,640 | B2 | 4/2007 | Morita |
| 7,208,833 | B2 | 4/2007 | Nobori et al. |
| 7,212,420 | B2 | 5/2007 | Liao |
| 7,239,532 | B1 | 7/2007 | Hsu et al. |
| 7,274,175 | B2 | 9/2007 | Manolescu |
| 7,315,460 | B2 | 1/2008 | Kyono |
| 7,386,286 | B2 | 6/2008 | Petrovic et al. |
| 7,450,388 | B2 | 11/2008 | Beihoff et al. |
| 7,564,706 | B1 | 7/2009 | Herbert |
| 7,596,007 | B2 | 9/2009 | Phadke |
| 7,701,305 | B2 | 4/2010 | Lin et al. |
| 7,724,555 | B1 * | 5/2010 | Simopoulos ................ 363/127 |
| 7,830,684 | B2 | 11/2010 | Taylor |
| 7,924,577 | B2 | 4/2011 | Jansen et al. |
| 7,924,578 | B2 | 4/2011 | Jansen et al. |
| 7,982,415 | B2 * | 7/2011 | Kimura ........................ 315/360 |
| 8,059,429 | B2 * | 11/2011 | Huynh ........................ 363/18 |
| 8,059,434 | B2 | 11/2011 | Huang et al. |
| 8,102,678 | B2 | 1/2012 | Jungreis |
| 8,125,181 | B2 | 2/2012 | Gregg et al. |
| 8,126,181 | B2 | 2/2012 | Yamamoto et al. |
| 8,134,848 | B2 | 3/2012 | Whittam et al. |
| 8,155,368 | B2 | 4/2012 | Cheung et al. |
| 8,159,843 | B2 | 4/2012 | Lund et al. |
| 8,193,662 | B1 | 6/2012 | Carlson et al. |
| 8,194,417 | B2 | 6/2012 | Chang |
| 8,207,717 | B2 | 6/2012 | Uruno et al. |
| 8,243,472 | B2 | 8/2012 | Chang et al. |
| 8,274,268 | B2 * | 9/2012 | Yen ........................ 323/282 |
| 8,344,689 | B2 | 1/2013 | Boguslavskij |
| 8,369,111 | B2 | 2/2013 | Balakrishnan et al. |
| 8,400,801 | B2 | 3/2013 | Shinoda |
| 8,654,553 | B1 | 2/2014 | Ye et al. |
| 2001/0036091 | A1 | 11/2001 | Yasumura |
| 2002/0008963 | A1 | 1/2002 | Dibene et al. |
| 2002/0011823 | A1 | 1/2002 | Lee |
| 2002/0036200 | A1 | 3/2002 | Ulrich et al. |
| 2002/0121882 | A1 * | 9/2002 | Matsuo ........................ G05F 1/565 323/266 |
| 2002/0196644 | A1 | 12/2002 | Hwang |
| 2003/0035303 | A1 | 2/2003 | Balakrishnan et al. |
| 2003/0112645 | A1 | 6/2003 | Schlecht |
| 2003/0128018 | A1 | 7/2003 | Telefus et al. |
| 2004/0062061 | A1 | 4/2004 | Bourdillon |
| 2004/0183510 | A1 | 9/2004 | Sutardja et al. |
| 2004/0252529 | A1 | 12/2004 | Huber et al. |
| 2005/0024016 | A1 | 2/2005 | Breen et al. |
| 2005/0036338 | A1 | 2/2005 | Porter et al. |

(56) References Cited

U.S. PATENT DOCUMENTS

| | | |
|---|---|---|
| 2005/0117376 A1 | 6/2005 | Wilson |
| 2005/0138437 A1 | 6/2005 | Allen et al. |
| 2005/0194942 A1 | 9/2005 | Hack et al. |
| 2005/0225257 A1 | 10/2005 | Green |
| 2005/0254268 A1 | 11/2005 | Reinhard et al. |
| 2005/0270001 A1 | 12/2005 | Jitaru |
| 2006/0002155 A1 | 1/2006 | Shteynberg et al. |
| 2006/0022637 A1 | 2/2006 | Wang et al. |
| 2006/0152947 A1 | 7/2006 | Baker et al. |
| 2006/0213890 A1 | 9/2006 | Kooken et al. |
| 2006/0232220 A1 | 10/2006 | Melis |
| 2007/0040516 A1 | 2/2007 | Chen |
| 2007/0120542 A1 | 5/2007 | LeMay |
| 2007/0121981 A1 | 5/2007 | Koh et al. |
| 2007/0138971 A1 | 6/2007 | Chen |
| 2007/0242487 A1 | 10/2007 | Orr |
| 2007/0247091 A1 | 10/2007 | Maiocchi |
| 2007/0263415 A1 | 11/2007 | Jansen et al. |
| 2007/0285854 A1* | 12/2007 | Rodgers ............ H02H 3/006 361/56 |
| 2007/0298653 A1 | 12/2007 | Mahoney et al. |
| 2008/0018265 A1 | 1/2008 | Lee et al. |
| 2008/0043496 A1 | 2/2008 | Yang |
| 2008/0191667 A1 | 8/2008 | Kernahan et al. |
| 2009/0034299 A1 | 2/2009 | Lev |
| 2009/0045889 A1 | 2/2009 | Goergen et al. |
| 2009/0128049 A1* | 5/2009 | Kimura ............ H05B 41/3927 315/279 |
| 2009/0196073 A1 | 8/2009 | Nakahori |
| 2009/0207637 A1 | 8/2009 | Boeke |
| 2009/0268487 A1 | 10/2009 | Park |
| 2009/0290384 A1 | 11/2009 | Jungreis |
| 2010/0008109 A1 | 1/2010 | Morota |
| 2010/0039833 A1 | 2/2010 | Coulson et al. |
| 2010/0066328 A1* | 3/2010 | Shimizu et al. ............ 323/282 |
| 2010/0103711 A1 | 4/2010 | Komatsuzaki |
| 2010/0110732 A1 | 5/2010 | Moyer |
| 2010/0253310 A1 | 10/2010 | Fonderie |
| 2010/0254057 A1 | 10/2010 | Chen |
| 2010/0289466 A1 | 11/2010 | Telefus |
| 2010/0315847 A1* | 12/2010 | Maher ............ 363/50 |
| 2010/0317216 A1 | 12/2010 | Pocrass |
| 2010/0322441 A1 | 12/2010 | Weiss et al. |
| 2010/0332857 A1 | 12/2010 | Vogman |
| 2011/0013437 A1 | 1/2011 | Uruno |
| 2011/0096573 A1 | 4/2011 | Zhu et al. |
| 2011/0096574 A1 | 4/2011 | Huang |
| 2011/0109248 A1 | 5/2011 | Liu |
| 2011/0127981 A1* | 6/2011 | Miyamae ............ 323/282 |
| 2011/0132899 A1 | 6/2011 | Shimomugi et al. |
| 2011/0157924 A1 | 6/2011 | Huynh |
| 2011/0211376 A1 | 9/2011 | Hosotani |
| 2011/0222318 A1 | 9/2011 | Uno et al. |
| 2011/0255311 A1 | 10/2011 | Hsu et al. |
| 2011/0261590 A1 | 10/2011 | Liu |
| 2012/0002451 A1 | 1/2012 | Djenguerian et al. |
| 2012/0069609 A1* | 3/2012 | Christophe et al. ......... 363/21.12 |
| 2012/0112657 A1 | 5/2012 | Van Der Veen et al. |
| 2012/0113686 A1 | 5/2012 | Telefus et al. |
| 2012/0113692 A1 | 5/2012 | Telefus |
| 2012/0144183 A1 | 6/2012 | Heinrichs et al. |
| 2012/0153866 A1 | 6/2012 | Liu |
| 2012/0176820 A1* | 7/2012 | Li et al. .................... 363/21.12 |
| 2013/0033905 A1 | 2/2013 | Lin et al. |
| 2013/0148385 A1 | 6/2013 | Zhang |
| 2013/0154391 A1 | 6/2013 | Urciuoli |
| 2013/0155728 A1 | 6/2013 | Melanson et al. |
| 2013/0194836 A1 | 8/2013 | Morris et al. |
| 2013/0215649 A1 | 8/2013 | Huang et al. |
| 2013/0250629 A1 | 9/2013 | Xu |
| 2013/0265807 A1* | 10/2013 | Lee et al. ................ 363/49 |
| 2013/0329469 A1 | 12/2013 | Kubota |
| 2014/0078790 A1 | 3/2014 | Lin |
| 2014/0211515 A1 | 7/2014 | Tomioka |
| 2014/0233275 A1 | 8/2014 | Yang |
| 2014/0268912 A1 | 9/2014 | Telefus |
| 2014/0268955 A1* | 9/2014 | Telefus .................... 363/89 |

FOREIGN PATENT DOCUMENTS

| | | |
|---|---|---|
| JP | 11202027 A | 7/1999 |
| JP | 2000083374 A | 3/2000 |
| JP | 20000253648 A | 9/2000 |
| JP | 2004208357 A | 7/2004 |

OTHER PUBLICATIONS

EE Times. com—"Wireless Beacon Could Recharge Consumer Devices", by R. Colin Johnson, 3 pages, Nov. 6, 2007.

Novel Zero-Voltage and Zero-Current Switching (ZVZCS) Full Bridge PWM converter Using Coupled Output Inductor, Sep. 2002 IEEE, pp. 641-648.

"New Architectures for Radio-Frequency dc/dc Power Conversion", Juan Rivas et al., Laboratory for Electromagnetic and Electronic Systems, Jan. 2004, Massachusetts Institute of Technology, Room 10-171 Cambridge, MA 02139, pp. 4074-4084.

"Randomized Modulation in Power Electronic Converters". Aleksander M. Stankovic, member IEEE, and Hanoch Lev-Ari, vol. 90, No. 5, May 2002, pp. 782-799.

"Analysis and Special Characteristics of a Spread-Spectrum Technique for Conducted EMI Suppression", K.K. tse, et al. Member IEEE, IEEE Transactions on Power Electronics, vol. 15., No. 2, Mar. 2000, pp. 399-410.

"Practical on-Line Identification of Power Converter Dynamic Responses", Botao Miao et al., Colorado Power Electronics Center, ECE Department, 2005, pp. 57-62.

"A Modified Cross-Correlation Method for System Identification of Power Converters with Digital Control", Botao Miao et al., Colorado Power Electronics Center, ECE Department, 2004, pp. 3728-3733.

"Design and Implementation of an Adaptive Tuning System Based on Desired Phase Margin for Digitally Controlled DC-DC Converters", Jeffrey Morroni et al., Member IEEE, 2009, pp. 559-564.

\* cited by examiner

NO LOAD DETECTION AND SLEW RATE COMPENSATION

RELATED APPLICATIONS

This Patent Application claims priority under 35 U.S.C. 119 (e) of the U.S. Provisional Application Ser. No. 61/799,124, filed Mar. 15, 2013, and entitled "New Power Management Integrated Circuit Partitioning With Dedicated Primary Side Control Winding". This application incorporates U.S. Provisional Application Ser. No. 61/799,124 in its entirety by reference.

FIELD OF THE INVENTION

The present invention is generally directed to the field of power converters. More specifically, the present invention is directed to power regulation control particularly during device wake-up under load.

BACKGROUND OF THE INVENTION

In many applications a power converter is required to provide a voltage within a predetermined range formed from a voltage source having a different voltage level. Some circuits are subject to uncertain and undesirable functioning and even irreparable damage if supplied power falls outside a certain range. More specifically, in some applications, a precise amount of power is required at known times. This is referred to as regulated power supply.

In order to control a power converter to deliver a precise amount of power as conditions require, some form of control of the power converter is required. This control can occur on the primary side of an isolation transformer or the secondary side. A closed loop feedback control system is a system that monitors some element in the circuit, such as the circuit output voltage, and its tendency to change, and regulates that element at a substantially constant value. Control on the secondary side of a power converter can use a monitored output voltage as feedback control, but requires the use of some communication from the secondary to the primary side of the isolation transformer to control the primary side switching element. Control on the primary side can readily control the primary side switching element, but requires some feedback mechanism from the secondary side to the primary side to convey the status of the monitored element.

FIG. 1 illustrates a conventional flyback type voltage converter. The converter 10 includes a transistor T1, a controller 14, a transformer 12, a capacitor C1, and a diode D1. Input voltage to the circuit may be unregulated DC voltage derived from an AC supply after rectification and filtering. The transistor T1 is a fast-switching device, such as a MOSFET, the switching of which is controlled by a fast dynamic controller 14 to maintain a desired regulated output voltage Vout. The secondary winding voltage is rectified and filtered using the diode D1 and the capacitor C1. The transformer 12 of the flyback converter functions differently than a typical transformer. Under load, the primary and secondary windings of a typical transformer conduct simultaneously. However, in the flyback converter, the primary and secondary windings of the transformer do not carry current simultaneously. In operation, when the transistor T1 is turned ON, the primary winding P1 of the transformer 12 is connected to the input supply voltage such that the input supply voltage appears across the primary winding P1, resulting in an increase of magnetic flux in the transformer 12 and the primary winding current rises linearly. However, with the transistor T1 turned ON, the diode D1 is reverse biased and there is no current through the secondary winding S1. Even though the secondary winding S1 does not conduct current while the transistor T1 is turned ON, the load, represented as resistor Rload, coupled to the capacitor C1 receives uninterrupted current due to previously stored charge on the capacitor C1.

When the transistor T1 is turned OFF, the primary winding current path is broken and the voltage polarities across the primary and secondary windings reverse, making the diode D1 forward biased. As such, the primary winding current is interrupted but the secondary winding S1 begins conducting current thereby transferring energy from the magnetic field of the transformer to the output of the converter. This energy transfer includes charging the capacitor C1 and delivery energy to the load. If the OFF period of the transistor T1 is sufficiently long, the secondary current has sufficient time to decay to zero and the magnetic field energy stored in the transformer 12 is completely dissipated.

To regulate the output voltage Vout, the output voltage or some representation of the output voltage, is provided to the controller 14. The controller 14 regulates a duty cycle of a pulse width modulation (PWM) signal used to drive the main switch, the transistor T1. The output voltage Vout is regulated by adjusting the duty cycle of the PWM signal.

A significant consideration of power converter design is to minimize power consumption under no load condition. This is typically achieved by putting the power converter into a low power mode, often referred to as a standby mode or a sleep mode, when a no load condition is detected. In normal operation, the main switch is turned ON and OFF at a high switching rate under control of the controller to maintain the regulated output voltage Vout. In sleep mode, the power converter operates in a burst mode. The PWM signal drives the main switch ON and OFF for a brief period, such as a few microseconds, followed by a longer period of inactivity where the main switch is turned OFF, such as for a few milliseconds. As shown in FIG. 2, during periods of inactivity, the output voltage Vout decays until it reaches a threshold value Vt, which represents a minimum operational voltage, at which point the power converter is active (time tburst) to deliver power to the output, thereby increasing the output voltage Vout back to the normal regulated value. Once the output voltage Vout increases to the desired level, such as the regulated voltage, the power converter resumes its inactive status, at time tinactive in FIG. 2.

When a load is connected while the controller is in sleep mode, the load draws from the output capacitor, thereby depleting the capacitor because the sleep mode is only providing short duration bursts of power. The initial response to the connected load is to sink a large amount of voltage which results in a drop of the output voltage that is supposed to be regulated. The controller requires some period of time to come out of sleep mode, but during this time period the connected load draws down the output voltage Vout below the threshold voltage Vt, as shown in FIG. 3. With the output voltage Vout below the threshold voltage, the voltage is out of regulation and the connected load determines insufficient power and shuts down or provides an error message. This is a deficiency of the sleep mode of operation. In conventional power converters, to keep the output voltage in regulation under transition from sleep mode to wake-up, an excessive output capacitor is required to keep output voltage form sinking below the threshold voltage Vt, which presents a huge inertia to the transient response.

SUMMARY OF THE INVENTION

A power regulation control circuit is implemented as part of a power converter. The power regulation control circuit is implemented during two modes, a sleep mode and a wake-up mode. During the sleep mode, the power regulation control circuit detects a no-load presence and artificially increases the output voltage Vout to its maximum allowable value. In some embodiments, this is accomplished by pulling up an output of an error amplifier that feeds a PWM module. During the wake-up mode while the power converter wakes up from the sleep mode under maximum load, the output voltage Vout sinks from the artificially higher voltage, but still stays above a minimum operational voltage level. A slew rate compensation is implemented to control a rate at which the output voltage drops when a load is applied. The slew rate compensation can be implemented in addition to or independent of artificially raising the no-load output voltage level. The artificially high output voltage during no-load condition and the slew rate compensation provide open loop voltage adjustment.

In an aspect, a method of controlling an output voltage of a power converter is disclosed. The method includes detecting a load condition at an output of the power converter while in a sleep mode, applying a slew rate compensation to the output voltage during a wake-up time period, and resuming regulation of the output voltage at a regulated output voltage level after the wake-up time period. In some embodiments, resuming regulation includes discontinuing the slew rate compensation. In some embodiments, applying the slew rate compensation includes increasing the output voltage at successive periodic intervals. In some embodiments, the sleep mode of operation includes alternating periods of inactivity and burst periods of activity. In some embodiments, the output voltage is periodically pulled-up according to a slope of an output voltage drop while the load condition is detected and before the controller wakes-up. In some embodiments, during the wake-up time period after a load is applied, the output voltage drops from a regulated output voltage level to an intermediate voltage level that is within the acceptable operating voltage range and above an under voltage condition.

In another aspect, another method of controlling an output voltage of a power converter is disclosed. The method includes determining between a load condition and a no-load condition at an output of the power converter. When a no-load condition is detected, a controller of the power converter enters a sleep mode. When a load condition is detected while in the sleep mode, the method includes applying a slew rate compensation to the output voltage until the controller wakes-up. In some embodiments, the method also includes resuming regulation of the output voltage at a regulated output voltage level once the controller wakes-up. In some embodiments, applying the slew rate compensation includes increasing the output voltage at successive periodic intervals. In some embodiments, the sleep mode of operation includes alternating periods of inactivity and burst periods of activity. In some embodiments, the output voltage is periodically pulled-up according to a slope of an output voltage drop while the load is detected and before the controller wakes-up. In some embodiments, during a wake-up time period after a load is applied, the output voltage drops from a regulated output voltage level to an intermediate voltage level that is within the acceptable operating voltage range and above an under voltage condition.

In yet another aspect, a power converter for regulating an output voltage supplied to a load is disclosed. The power converter includes a power regulation control circuit configured to detect a load condition at an output of the power converter while in a sleep mode, apply a slew rate compensation to the output voltage during a wake-up time period, and resume regulation of the output voltage at a regulated output voltage level after the wake-up time period. In some embodiments, the output voltage remains within an acceptable operating voltage range that is below an over voltage condition and above an under voltage range while applying the slew rate compensation. In some embodiments, the power regulation control circuit is configured to apply the slew rate compensation by increasing the output voltage at successive periodic intervals. In some embodiments, the power regulation control circuit is configured to apply the slew rate compensation by providing voltage adjustments according to a slope of an output voltage level drop while the load is detected during the wake-up time period.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Embodiments of the present application are directed to power regulation control. Those of ordinary skill in the art will realize that the following detailed description of power regulation control is illustrative only and is not intended to be in any way limiting. Other embodiments of power regulation control will readily suggest themselves to such skilled persons having the benefit of this disclosure.

Reference will now be made in detail to implementations of power regulation control as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and timeconsuming, but would nevertheless be a routine undertaking of engineering for those of ordinary skill in the art having the benefit of this disclosure.

Embodiments of a power regulation control circuit are implemented as part of a power converter. The power regulation control circuit performs a sleep mode operation and a wake-up mode operation. The power regulation control circuit determines when a no-load condition exists and then enters the sleep mode of operation. The sleep mode of operation is a low-power operation mode characterized by alternating periods of inactivity and burst modes of activity. Upon entering the sleep mode, the power regulation control circuit prepares itself for an eventual load condition. No-load operation can be determined using any conventional means. In some embodiments, the means for determining the no-load condition are the same as conventional means for determining when the device goes into sleep mode.

Figure 4:
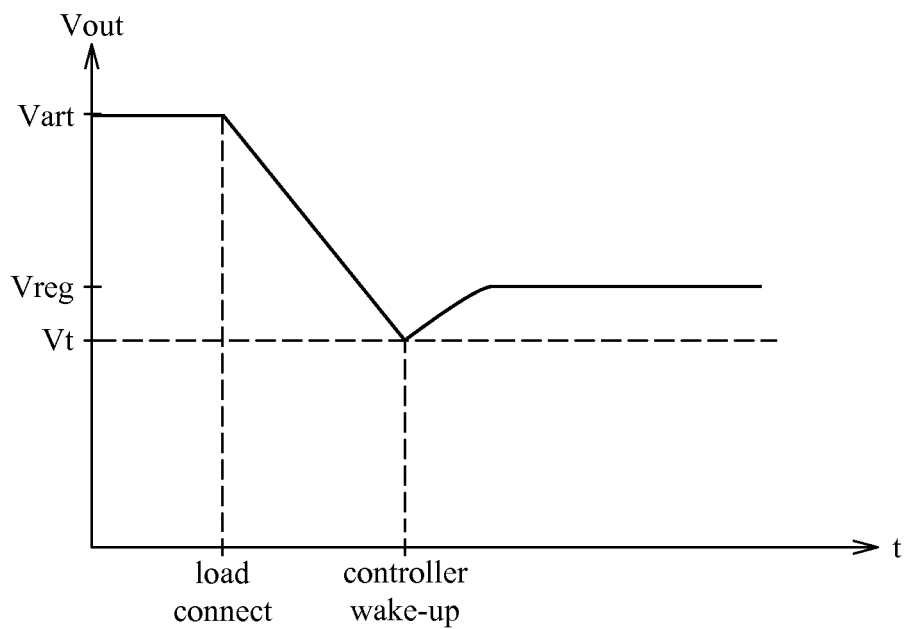
FIG. 4 illustrates an exemplary output voltage at an artificially high level before and after a load is applied to the power converter while in sleep mode.

When a no-load condition is detected and the sleep mode is entered, the output voltage is artificially changed to a higher value. This artificial setting makes the output voltage Vout higher than the standard regulated level Vreg, but within an acceptable operating voltage range. In an exemplary application, the standard regulated voltage level is 5V, and the artificial voltage level is set to 5.5V. Devices typically operate within an acceptable operating voltage range, for example between 4.85 V and 5.6V. Over 5.6V is considered an over voltage condition, and under 4.85V is considered an under voltage condition. Both the over voltage condition and the under voltage condition are considered error conditions. The output voltage level can be increased beyond the standard regulated level because no load is connected to the output. When a load is applied while in the sleep mode, the output voltage sinks before a controller of the power converter wakes up. By setting the output voltage level to an artificially high level Vart, the output voltage does not drop below the threshold voltage Vt for minimum regulation, since the voltage starts dropping from the artificially higher voltage value, as shown in FIG. 4. Setting the output voltage level to the artificially high level Vart provides additional time for the controller to wake-up and activate charging before the output voltage level Vout sinks below the minimum regulation voltage level. Once a load condition is established and the wake-up time period for the controller has elapsed, the power converter resumes normal voltage regulation at Vreg, such as 5V.

Setting the output voltage level to the artificially high level is effective when performed during a no-load condition. Simply increasing the regulated output voltage level to the high end of the operational voltage range, which would provide additional time for controller to wake-up during sleep mode, is ineffective because when in a load condition the output voltage level swings up and down, an upswing beginning from the high end of the operational voltage range would result in an over voltage condition.

Figure 1:
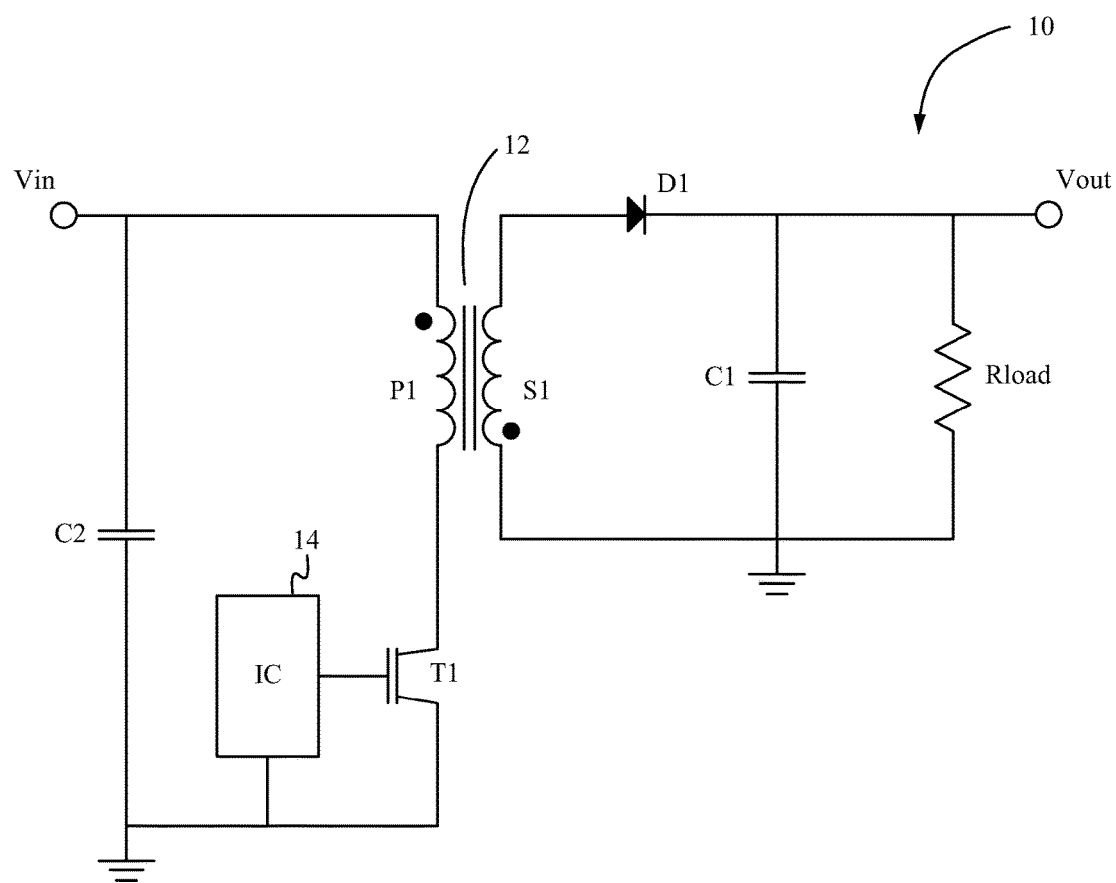
FIG. 1 illustrates a conventional flyback type voltage converter.
Figure 2:
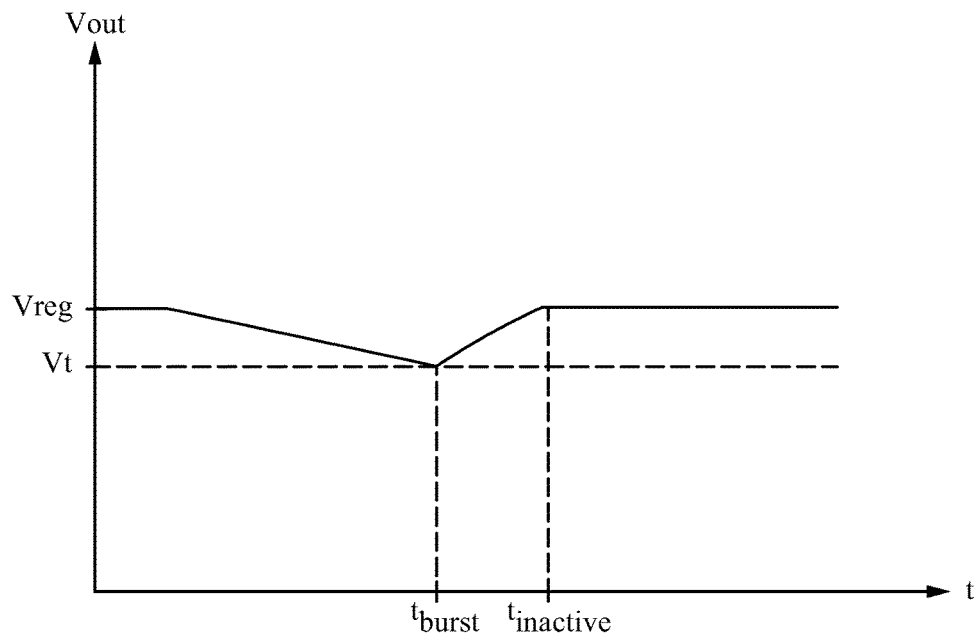
FIG. 2 illustrates an exemplary output voltage while the power converter is in sleep mode.
Figure 3:
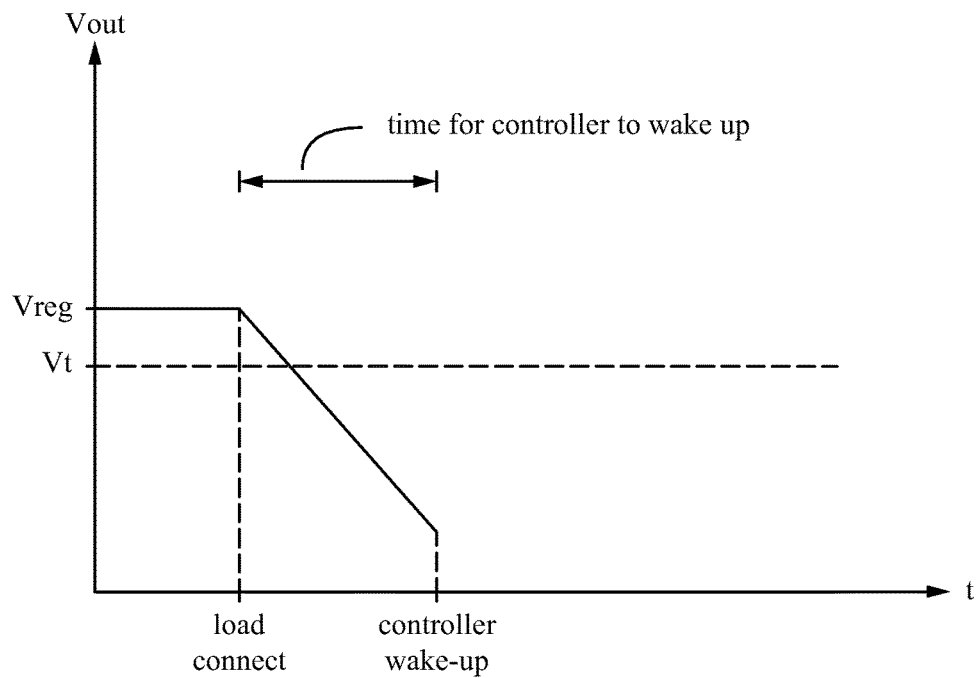
FIG. 3 illustrates an exemplary output voltage before and after a load is applied to the power converter while in sleep mode.
Figure 5:
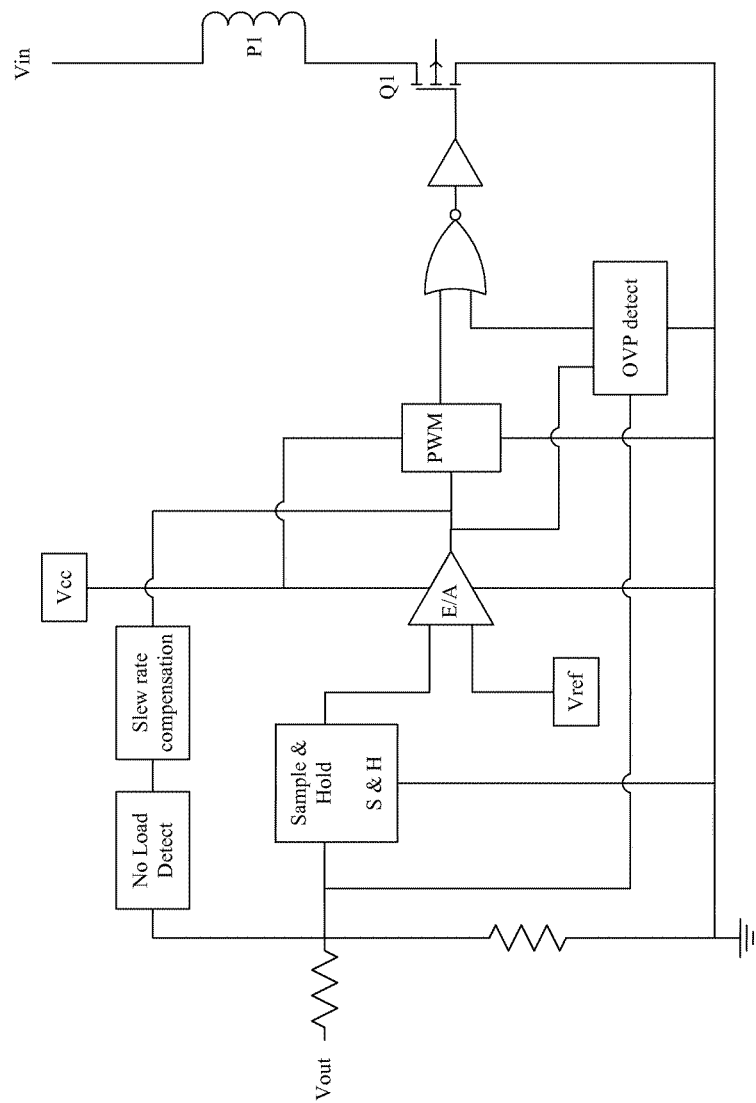
FIG. 5 illustrates an exemplary primary side of a power converter including a schematic block diagram of a power regulation control circuit according to an embodiment.

FIG. 5 illustrates an exemplary primary side of a power converter including a schematic block diagram of a power regulation control circuit according to an embodiment. In an exemplary implementation, the power regulation control circuit is implemented within a controller of a power converter. It is understood that the power regulation control circuit can be implemented separately from the controller. The output voltage Vout is provided to a primary side controller for regulation. Any conventional means can be used to provide the output voltage Vout, or any representation thereof, to the primary side controller. The controller is coupled to the main switch Q1, such as a MOSFET or other type of transistor. The main switch Q1 is coupled in series with the primary winding P1 of the power converter. The primary winding P1 is coupled to an input voltage Vin. The secondary side of the power converter is not shown in FIG. 5. It is understood that the power regulation control circuit can be applied to a variety of different types of power converter architectures. In an exemplary configuration, the power converter has a flyback type configuration and the secondary side of the power converter is configured similarly as the secondary side in FIG. 1.

A No Load Detect block determines a no-load condition at the output. When a no-load condition is detected, the output of the error amplifier (E/A) is pulled up high enough to turn ON the main switch Q1 using a different pulse width modulation mode than for standard regulation in order to increase the output voltage Vout to the higher artificial level, for example 5.5V. As soon as a load is detected, the output from the error amplifier is no longer pulled up and standard regulation, such as 5V, is resumed.

Figure 6:
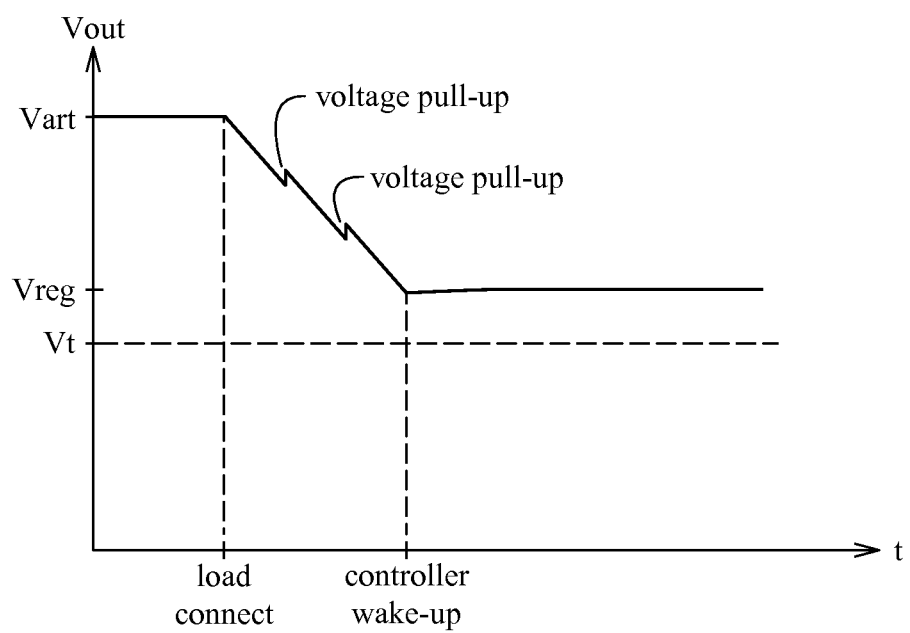
FIG. 6 illustrates an exemplary voltage output waveform with periodic slew rate compensation in the form of voltage pull-ups.

In some embodiments, a slew rate control is implemented during the wake-up period of the controller. Operation during this time period is referred to as the wake-up mode operation. When the load is applied while the power converter is in sleep mode, the output voltage will drop as described above. The slew rate control functions to decrease the rate at which the output voltage drops during this wake-up time period. So during the wake-up time period when the load is applied and the controller wakes-up, a slew rate compensation block monitors the output voltage drop and periodically performs an output voltage adjustment by pulling up the output of the error amplifier. FIG. 6 illustrates an exemplary voltage output waveform with period slew rate compensation in the form of voltage pull-ups. In this manner, by the time the controller wakes-up, the voltage output drop is not as much as if no slew rate compensation is implemented, as in FIG. 4. In this exemplary embodiment, the slew rate compensation is implemented along with the artificially high no-load output voltage. In other embodiments, the slew rate compensation is implemented without also using an artificially high no-load output voltage.

In an exemplary implementation, the artificial output voltage is set at 5.5V during sleep mode with no-load condition. When a load is applied the output voltage begins to drop to 5.1V, at which point the slew rate compensation pulls-up the output voltage to 5.3V. The output voltage continues to drop from 5.3V to 4.9V, when another slew rate compensation is implemented increasing the output voltage to 5.1V. This continues until the controller wakes-up.

The voltage supplied to the PWM module is periodically forced higher by the slew rate compensation block. This functions to increase the duty cycle of the PWM signal supplied to the main switch Q1. In some embodiments, the slew rate compensation is implemented using an RC time constant to mimic the slope of the output voltage drop due to load. Knowing the slope, the output voltage is periodically pulled up.

Implementation of the artificially high output voltage and the slew rate compensation occurs outside of the regulation feedback loop. These two techniques are open loop techniques.

These techniques can also be applied to compensate for voltage loss in the cable of the power supply.

The present application has been described in terms of specific embodiments incorporating details to facilitate the understanding of the principles of construction and operation of power regulation control. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A method of controlling an output voltage of a power converter, the method comprising:
   a. while in a sleep mode, periodically turning a main switch ON and OFF according to a burst mode of operation and detecting a load condition at an output of the power converter comprising the main switch coupled to a primary side winding and the load coupled to a secondary side winding, wherein the load condition causes the output voltage to decrease at a first rate during a wake-up time period, wherein a rate is an amount of output voltage decrease during the wake-up time period divided by the wake-up time period;
   b. applying a plurality of slew rate compensation adjustments to a driving signal for the main switch of the power converter, wherein each slew rate compensation adjustment results in a voltage pull-up of the output voltage during the wake-up time period to decrease the first rate to a second rate at which the output voltage decreases during the wake-up period; and
   c. discontinuing application of the plurality of slew rate compensation adjustments and resuming regulation of the output voltage at a regulated output voltage level after the wake-up time period.

2. The method of claim 1 wherein resuming regulation comprises discontinuing the slew rate compensation adjustments to the driving signal.

3. The method of claim 1 wherein applying the slew rate compensation adjustments comprises increasing the output voltage at successive periodic intervals.

4. The method of claim 1 wherein when the load is coupled to the output while in the sleep mode, the output voltage drops, further wherein applying the slew rate compensation adjustments comprises increasing the output voltage at successive periodic intervals.

5. The method of claim 1 wherein the sleep mode of operation comprises alternating periods of inactivity and burst periods of activity.

6. The method of claim 1 wherein the output voltage is periodically pulled-up according to a slope of an output voltage drop while the load condition is detected and before the controller wakes-up.

7. The method of claim 1 wherein during the wake-up time period after a load is applied, the output voltage drops from a regulated output voltage level to an intermediate voltage level that is within the acceptable operating voltage range and above an under voltage condition.

8. The method of claim 1 wherein during a wake-up time period after the load is applied, the output voltage drops from a regulated output voltage level to an intermediate voltage level that is within the acceptable operating voltage range and above an under voltage condition.

9. The method of claim 1 wherein being in the sleep mode corresponds to a no-load condition.

10. The method of claim 1 wherein each slew rate compensation adjustment is triggered according to a set RC time constant.

11. The method of claim 1 wherein the power converter further comprises a signal modulator connected to the main switch and an error amplifier connected to the signal modulator, wherein an error signal is output from the error amplifier to the signal modulator and the plurality of slew rate compensation adjustments are applied to the error signal.

12. A method of controlling an output voltage of a power converter, the method comprising:
   a. determining between a load condition and a no-load condition at an output of the power converter, wherein the power converter comprises a main switch coupled to a primary side winding and a load coupled to a secondary side winding during the load condition;
   b. when a no-load condition is detected, a controller of the power converter enters a sleep mode which includes periodically turning the main switch ON and OFF according to a burst mode of operation; and
   c. when a load condition is detected while in the sleep mode, applying a plurality of slew rate compensation adjustments to a driving signal for the main switch of the power converter, wherein each slew rate compensation adjustment results in a voltage pull-up of the output voltage until the controller wakes-up, wherein the load condition causes the output voltage to decrease at a first rate during a wake-up time period and applying the slew rate compensation adjustments decreases the output voltage decrease to a second rate that is less than the first rate, wherein a rate is an amount of output voltage decrease during the wake-up time period divided by the wake-up time period.

13. The method of claim 12 further comprising discontinuing application of the plurality of slew rate compensation adjustments and resuming regulation of the output voltage at a regulated output voltage level once the controller wakes-up.

14. The method of claim 12 wherein applying the slew rate compensation adjustments comprises increasing the output voltage at successive periodic intervals.

15. The method of claim 12 wherein when the load is coupled to the output while the controller is in the sleep mode, the output voltage drops, further wherein applying the slew rate compensation adjustments comprises increasing the output voltage at successive periodic intervals.

16. The method of claim 12 wherein the sleep mode of operation comprises alternating periods of inactivity and burst periods of activity.

17. A power converter for regulating an output voltage supplied to a load, the power converter comprises a power regulation control circuit having a main switch coupled to a primary side winding and the load coupled to a secondary side winding, the power regulation control circuit configured to periodically turn the main switch ON and OFF according to a burst mode of operation while in a sleep mode and to detect a load condition at an output of the power converter while in the sleep mode, wherein the load condition causes the output voltage to decrease at a first rate during a wake-up time period, wherein a rate is an amount of output voltage decrease during the wake-up time period divided by the wake-up time period, apply a plurality of slew rate compensation adjustments to a driving signal for the main switch of the power converter, wherein each slew rate compensation adjustment results in a voltage pull-up of the output voltage during the wake-up time period to decrease the first rate to a second rate at which the output voltage decreases during the wake-up period, and discontinue application of the plurality of slew rate compensation adjustments and resume regulation of the output voltage at a regulated output voltage level after the wake-up time period.

18. The power converter of claim 17 wherein the output voltage remains within an acceptable operating voltage range that is below an over voltage condition and above an under voltage range while applying the slew rate compensation.

19. The power converter of claim 17 wherein the power regulation control circuit is configured to apply the slew rate compensation adjustments by increasing the output voltage at successive periodic intervals.

20. The power converter of claim 17 wherein the power regulation control circuit is configured to apply the slew rate compensation adjustments by providing voltage adjustments according to a slope of an output voltage level drop while the load is detected during the wake-up time period.

* * * * *